United States Patent [19]

Elings et al.

[11] Patent Number: 5,519,212

[45] Date of Patent: May 21, 1996

[54] TAPPING ATOMIC FORCE MICROSCOPE WITH PHASE OR FREQUENCY DETECTION

[75] Inventors: Virgil B. Elings; John A. Gurley, both of Santa Barbara, Calif.

[73] Assignee: Digital Instruments, Incorporated, Santa Barbara, Calif.

[21] Appl. No.: 381,159

[22] Filed: Jan. 31, 1995

Related U.S. Application Data

[63] Continuation-in-part of Ser. No. 926,175, Aug. 7, 1992, Pat. No. 5,412,980.

[51] Int. Cl.⁶ ........................................ G01B 7/34
[52] U.S. Cl. ............................ 250/234; 73/105; 250/306
[58] Field of Search ........................... 250/234, 201.1, 250/306, 307, 559.06, 559.23, 559.22; 73/105, 632, 579

[56] References Cited

U.S. PATENT DOCUMENTS

| | | | |
|---|---|---|---|
| 4,935,634 | 6/1990 | Hansma et al. | 250/559.23 |
| 5,212,987 | 5/1993 | Dransfeld et al. | |
| 5,254,854 | 10/1993 | Betzig | 250/234 |
| 5,308,974 | 5/1994 | Elings et al. | 250/234 |
| 5,406,832 | 4/1995 | Gamble et al. | |
| 5,408,094 | 4/1995 | Kajimura | 250/234 |
| 5,412,980 | 5/1995 | Elings et al. | 73/105 |
| 5,415,027 | 5/1995 | Elings et al. | 73/105 |
| 5,418,363 | 5/1995 | Elings et al. | 250/306 |
| 5,436,448 | 7/1995 | Hosaka et al. | 250/306 |

*Primary Examiner*—Edward P. Westin
*Assistant Examiner*—John R. Lee
*Attorney, Agent, or Firm*—Oblon, Spivak, McClelland, Maier & Neustadt

[57] ABSTRACT

An atomic force microscope in which a probe tip is oscillated at a resonant frequency and at amplitude setpoint and scanned across the surface of a sample, which may include an adsorbed water layer on its surface, at constant amplitude in intermittent contact with the sample and changes in phase or in resonant frequency of the oscillating are measured to determine adhesion between the probe tip and the sample. The setpoint amplitude of oscillation of the probe is greater than 10 nm to assure that the energy in the lever arm is much higher than that lost in each cycle by striking the sample surface, thereby to avoid sticking of the probe tip to the sample surface. In one embodiment the probe tip is coated with an antibody or an antigen to locate corresponding antigens or antibodies on the sample as a function of detected variation in phase or frequency. In another embodiment, the frequency of oscillation of the probe tip is modulated and relative changes in phase of the oscillating probe tip observed in order to measure the damping of the oscillation due to the intermittent or constant tapping of the surface by the tip. In a further embodiment, the slope of the phase versus frequency curve is determined and outputted during translating of the oscillating probe. Force dependent sample characteristics are determined by obtaining data at different tapping amplitude setpoints and comparing the data obtained at the different tapping amplitude setpoints.

30 Claims, 10 Drawing Sheets

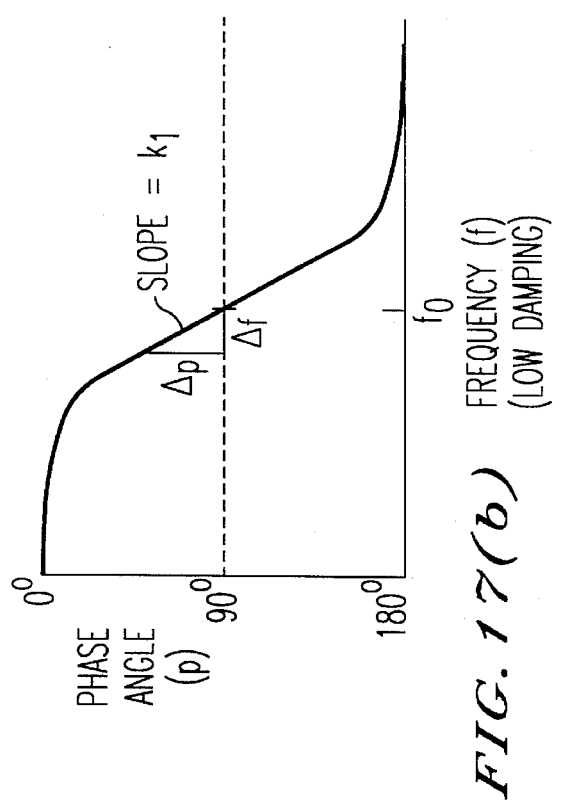
FIG. 17(a)
FIG. 17(b)
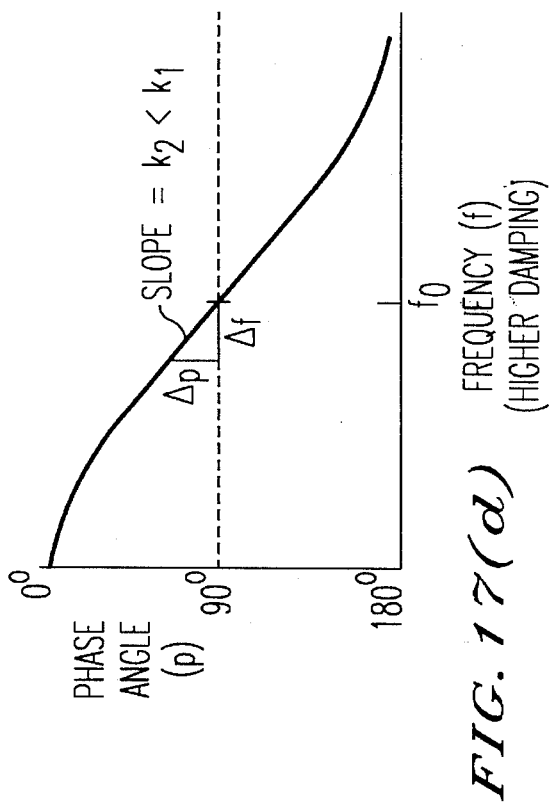
FIG. 17(c)
FIG. 17(d)
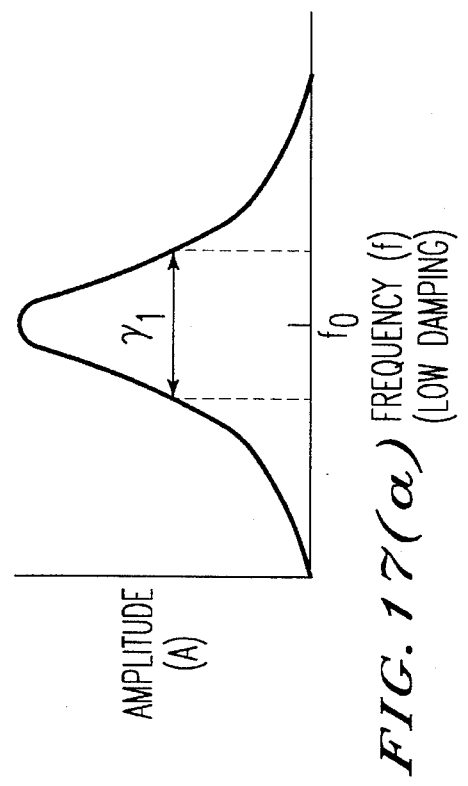
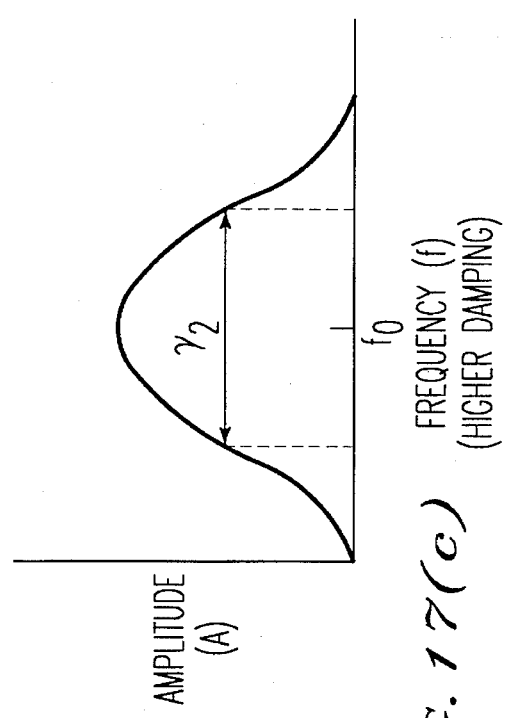

000
TAPPING ATOMIC FORCE MICROSCOPE WITH PHASE OR FREQUENCY DETECTION

CROSS-REFERENCE TO RELATED APPLICATIONS

This application is a continuation-in-part of U.S. application Ser. No. 07/926,175 filed Aug. 7, 1992 now U.S. Pat. No. 5,412,980.

BACKGROUND OF THE INVENTION

1. Field of the Invention

This invention relates to an ultra-low force atomic force microscope, and particularly an improvement to the atomic force microscope described in related commonly owned U.S. patent application Ser. No. 08/147,571 and related U.S. Pat. Nos. 5,229,606 and 5,266,801.

2. Discussion of the Background

Atomic Force Microscopes (AFM's) are extremely high resolution surface measuring instruments. Two types of AFM's have been made in the past, the contact mode (repulsive mode) AFM and the non-contact (attractive mode) AFM.

The contact mode AFM is described in detail in U.S. Pat. No. 4,935,634 by Hansma et al, as shown in FIG. 2. This AFM operates by placing a sharp tip attached to a bendable cantilever directly on a surface and then scanning the surface laterally. The bending of the lever in response to surface height variations is monitored by a detection system. Typically, the height of the fixed end of the cantilever relative to the sample is adjusted with feedback to maintain the bending at a predetermined amount during lateral scanning. The adjustment amount versus lateral position creates a map of the surface. The deflection detection system is typically an optical beam system as described by Hansma et al. Using very small microfabricated cantilevers and piezoelectric positioners as lateral and vertical scanners, AFM's can have resolution down to molecular level, and may operate with controllable forces small enough to image biological substances. Since AFM's are relatively simple, inexpensive devices compared to other high resolution techniques and are extremely versatile, they are becoming important tools in a wide variety of research and high technology manufacturing applications. The contact mode AFM, in which the tip is maintained in continuous contact with the sample, is currently the most common type, and accounts for essentially all the AFM's sold commercially to date.

The contact AFM has found many applications. However, for samples that are very soft or interact strongly with the tip, such as photoresist, some polymers, silicon oxides, many biological samples, and others, the contact mode has drawbacks. As pointed out in Hansma et al, the tip may be attracted to the surface by the thin liquid layer on all surfaces in ambient conditions, thus increasing the force with which the tip presses on the surface. The inventors and others have also observed that electrostatic forces may attract the tip to the surface, particularly for some tip-sample combinations such as silicon nitride tips on silicon oxide surfaces. When the tip is scanned laterally under such conditions, the sample experiences both compressive and shearing forces. The lateral shearing forces may make the measurement difficult and for soft samples may damage the sample. Further, a stick-slip motion may cause poor resolution and distorted images. Hansma et al's approach to this problem was to immerse the tip, cantilever, and sample surface in liquid, thus eliminating the surface layer forces, and for a polar liquid, the electrostatic forces. This technique works very well, and has the further advantage that it allows samples that are normally hydrated to be imaged in their natural state. However for many samples and applications, immersion in liquid is not of much use. Operating in liquid requires a fluid cell and increases the complexity of using the AFM, and for industrial samples such as photoresist and silicon wafers, immersion is simply not practical.

The non-contact AFM, developed by Martin et al, *J. Applied Physics*, 61(10), 15 May, 1987, profiles the surface in a different fashion than the contact AFM. In the non-contact AFM, the tip is scanned above the surface, and the very weak Van der Waals attractive forces between the tip and sample are sensed. Typically in non-contact AFM's, the cantilever is vibrated at a small amplitude and brought near to the surface such that the force gradient due to interaction between the tip and surface modifies the spring constant of the lever and shifts its natural resonant frequency. The shift in resonance will change the cantilever's response to the vibration source in a detectable fashion. Thus the amount of change may be used to track the surface typically by adjusting the probe surface separation during lateral scanning to maintain a predetermined shift from resonance. This AC technique provides greater sensitivity than simply monitoring the DC cantilever deflection in the presence of the attractive Van der Waals force due to the weak interaction between the tip and surface. The frequency shift may be measured directly as proposed by Albrecht et al, *J. Applied Physics*, 1991, or indirectly as was done originally by Martin et al.

The indirect method uses a high Q cantilever, such that damping is small. The amplitude versus frequency curve of a high Q lever is very steep around the resonant frequency. Martin et al oscillated the lever near the resonant frequency and brought the tip close to the surface. The Van der Waals interaction with the surface shifts the resonance curve. This has the effect of shifting the resonance closer or further to the frequency at which the lever is oscillated, depending on which side of resonance the oscillation is at. Thus, indirectly, the amplitude of oscillation will either increase or decrease as a consequence of the resonance shift. The amplitude change is measurable (AM type detection). This change in amplitude close to the surface compared to the amplitude far away from the surface (the free amplitude) can be used as a setpoint to allow surface tracking. The direct method measures the frequency shift itself (FM type detection). Both methods are bound by the same interaction constraints.

FIG. 5 illustrates this non-contact operation. The tip is driven at a known amplitude and frequency of oscillation, which is typically near a cantilever resonance. The amplitude of this oscillation is detected by a deflection detector, which can be of various types described in the references. When the tip is sufficiently far away from the surface, it will oscillate at the free amplitudes $A_o$, as shown in FIG. 5. As shown in FIG. 5, when the tip is brought closer to the surface, the Van der Waals interaction will shift the resonant oscillatory frequency slightly. This shift causes either an increased or decreased amplitude, $A_s$, or the frequency shift may be measured directly. This modified amplitude value may be used as a setpoint in the manner of other above described SPM's, such that as the tip is scanned laterally, the tip height may be adjusted with feedback to keep setpoint, $A_s$, at a constant value. Thus an image of the surface may be generated without surface contact, and without electrical interaction as needed by a scanning tunnelling microscope STM. The resonant shift may also be caused by other force interactions, such as magnetic field interaction with a magnetic tip. Thus this type of AFM may in theory be easily configured to map a variety of parameters using the same or similar construction.

The Van der Waals force is very weak, and decreases rapidly with separation, so the practical furthest distance for measurable interaction is 10 nm above the surface, as shown in FIG. 1, taken from Sarid, *Scanning Force Microscopy*, Oxford University Press, 1991. To shift the resonance of the lever, the lever must oscillate within this envelope of measurable force gradient. If just a small portion of the oscillation is within the envelope, the resonance will not be appreciably affected. Thus the oscillation amplitude must be small. A compendium of all non-contact AFM research can be found in *Scanning Force Microscopy* by Sarid, above noted, no researcher was able to operate a non-contact AFM with a free oscillation amplitude of greater than 10 nm. This limitation as will be shown limits the usefulness of the non-contact method.

Although developed at essentially the same time as the contact AFM, the non-contact AFM has rarely been used outside the research environment due to problems associated with the above constraints. The tip must be operated with low oscillation amplitude very near the surface. These operating conditions make the possibility very likely of the tip becoming trapped in the surface fluid layer described by Hansma et al. This effect is illustrated in FIG. 6, an amplitude versus displacement curve. A cantilever with probe is oscillated at a free amplitude $A_o$, and the vertical position of the fixed end of the lever is varied from a height where the probe is not affected by the surface to a point where the probe is captured by the surface and oscillation ceases. The curve is typical for oscillation amplitudes of 10 nm or less. Such curves have been measured by the inventors, and were also described by Martin et al, and also by Ducker et al, in "Force Measurement Using an AC Atomic Force Microscope", *J. of Applied Physics*, 67(9), 1 May 1990. As the curve clearly shows, when the tip is brought near the surface there is a narrow region where the amplitude is affected by the Van der Waals interaction before it becomes abruptly captured by the surface fluid layer, and oscillation becomes very small It is this narrow region in which the non-contact AFM must operate As a surface is scanned, any variations in the surface topography may cause the tip to become captured if the feedback cannot perfectly respond to the topography variations. If the tip does become captured, the control system will lift the fixed end of the lever until the tip breaks free, and then re-establish the setpoint. As can be seen from FIG. 6, there is significant hysteresis in the withdraw process, which will cause serious instability in the image data. Thus non-contact microscopes must scan very slowly so the feedback loop has sufficient time to prevent the tip becoming stuck to the surface. Moreover, because the tip must be operated above the fluid layer, the lateral resolution is inferior to the contact mode. Typically, the noncontact AFM must operate with the tip 5–10 nm above the surface, which limits the lateral resolution to 5–10 nm. Contact mode AFM's typically have lateral resolution of better than 1 nm.

For measuring the frequency shift using amplitude detection, the sensitivity depends on the cantilever having a very sharp resonance peak, which in turn gives a very slow response time because undamped systems require a long time to recover from a perturbation. Thus, sensitivity and response time are inversely coupled. The high Q requirement also places restrictions on the design of the lever to minimize the effect of air as a damping agent. One could improve the time response by using cantilevers which may be operated at a higher frequency, but such levers are stiffer and therefore have reduced sensitivity to the Van der Waals interaction. Thus it can be seen that high sensitivity and fast response are very difficult to achieve with a non-contact AFM. Furthermore, the weak force interaction places restrictions on the height at which the tip may be operated and the amplitude of oscillation. The presence of the fluid layer near this height makes capture of a lever with a small oscillation likely, so slow time response is a serious stability problem. For these reasons, despite their many potential advantages, non-contact AFM's have yet to be successful commercially.

The non-contact AFM has been used successfully in the measurement of magnetic fields on objects such as magnetic storage media. With a tip of, or coated with, magnetic material, the force interaction between the tip and magnetic sample is much stronger than the Van der Waals interactions, and is longer range. Thus, the non-contact FM (also called magnetic force microscope, MFM) may be operated without the need for ultra-high sensitivity, as required for surface profiling. However since magnetic fields are seldom continuous, some interaction is necessary to guide the tip over the surface between magnetic regions. Rugar et al, (Magnetic Force Microscopy, IBM Research Report, Almaden Research Center, Dec. 12, 1990) found that applying an electric field between the tip and sample would produce a larger effect than the Van der Waals force, so the hard disks could be scanned without the probe sticking to the surface. This method limits the technique to conductive surfaces.

SUMMARY OF THE INVENTION

Accordingly, one object of this invention is to provide a novel AFM that does not produce shear forces during scanning and does not have the operability limitations of the non-contact AFM.

A further object of the invention is to provide a novel AFM and method to profile surfaces, including soft or sticky surfaces, at high resolution with high sensitivity and fast time response, thus overcoming the drawbacks of prior art contact and non-contact mode AFM's.

It is a further object of this invention to provide an AFM that may map magnetic or other force distributions while retaining the ability to track topography without other force components.

These and other objects are achieved according to the present invention by providing a new and improved AFM and method of operating an AFM, wherein the probe is oscillated at or near resonance or a resonant harmonic to strike the surface of the sample, so that the tip has minimal lateral motion while in contact with the surface, thus eliminating scraping and tearing. The cantilever probe is oscillated at a large amplitude, greater than 10 nm, preferably greater than 20 nm, and typically on the order of 100–200 nm, so that the energy in the lever is large enough, much higher than that lost in each oscillation cycle due to, for example, damping upon striking the same surface, so that the tip will not become stuck to the surface. The oscillation amplitude is affected by the tip striking the surface in a measurable fashion, and this limited amplitude is a direct measure of the topography of the surface. Alternatively, a feedback control can be employed to maintain the oscillation amplitude constant, and then a feedback control signal can be used to measure surface topography. The striking interaction is strong, so the sensitivity is high. The resolution approaches the contact mode microscope because the tip touches the surface. The technique can use high frequency jumps with no loss in sensitivity since the measurement of the amplitude change does not depend on frequency.

The invention may be employed in the measure of magnetic or other force distributions in conjunction with the non-contact method, to track the surface in regions where there is no other force.

In further embodiments, the probe is oscillated and translated across the surface of the sample at constant amplitude and changes in phase are detected and corresponding output signals produced. In another variation, a relative phase between a drive signal causing oscillation of the probe and deflection of the probe is detected and the frequency of oscillation of the probe varied so that the relative phase is kept essentially constant during scanning. An output signal is then produced indicative of variations in the frequency of oscillation of the probe as a function of position during scanning. According to a further embodiment, oscillation frequency is modulated by an amount $\Delta f$, changes in relative phase $\Delta p$ detected, and signals indicative of the slope $\Delta p/\Delta f$ output. In a further embodiment, data is obtained by operating at different tapping amplitude setpoints and then compared to discriminate a force dependent sample characteristic.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 14b is a graph illustrating the observed oscillation amplitude resulting from the scanning of FIG. 14a;

FIGS. 17a and 17c are graphs showing the effect of damping on oscillation amplitude as a function of frequency, and FIGS. 17b and 17d are graphs showing the effect of damping on the slope of the phase vs. frequency curve.

DESCRIPTION OF THE PREFERRED EMBODIMENT

The present invention utilizes the inventors' discovery that if the probe is oscillated at or near one of the resonant frequencies of the lever, that in fact the probe tip has much less of a tendency to stick to the surface because a resonant system tends to remain in stable oscillation even if some damping exists. Thus the preferred embodiment of the present invention utilizes a resonant oscillation of the cantilever at sufficient oscillation amplitude to achieve the advantages described above without the probe becoming stuck to the surface. This preferred embodiment also provides many of the benefits of the non-contact AFM as described above.

Existing development of AFM's using oscillation of the probes has been directed at avoiding surface contact, as described above, and as such is limited in practicality despite the potential advantages of the technique. For applications where the non-contact mode is desired, the inventors have found that the amplitude-distance curve of FIG. 6 can of be of great aid in establishing the setpoint for non-contact mode operation. Using the amplitude-distance curve, one can optimize the operating frequency, free amplitude and setpoint to achieve the most suitable operating characteristics for a particular sample and cantilever combination. This novel application of the curve was clearly not anticipated by Ducker or Martin. Using the computational and display capabilities of typical scanning probe microscopes, SPM's, the lever may be oscillated and the lever vertical position varied, while the curve is displayed on a terminal. The various parameters may be varied, such that desired operating conditions may be determined, and used when the SPM is in the imaging mode.

Figure 6:
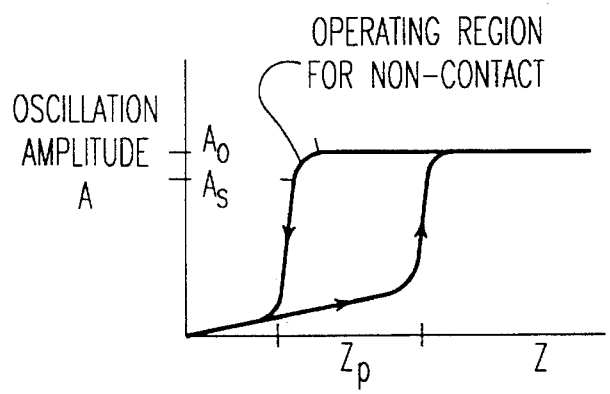
FIG. 6 is a graph of an amplitude vs. position curve that illustrates the behavior of the probe oscillation in a prior art non-contact mode AFM as a function of probe height above a surface.

The AFM of the present invention does not avoid contact with the surface. Thus, the invention is not limited in the amplitude of oscillation, and in fact as will be shown, very large amplitudes compared to the non-contact mode are advantageous. In FIG. 6, it is shown that for small oscillation amplitudes as the tip is brought near the surface, it becomes trapped by the fluid layer and oscillation ceases abruptly. If the oscillation amplitude is larger, greater than 10 nm, preferably greater than 20 nm and typically 100–200 nm, then the energy in the oscillation may be sufficient in most cases to overcome the stickiness of the surface for a wide range of vertical positions of the lever.

Figure 7:
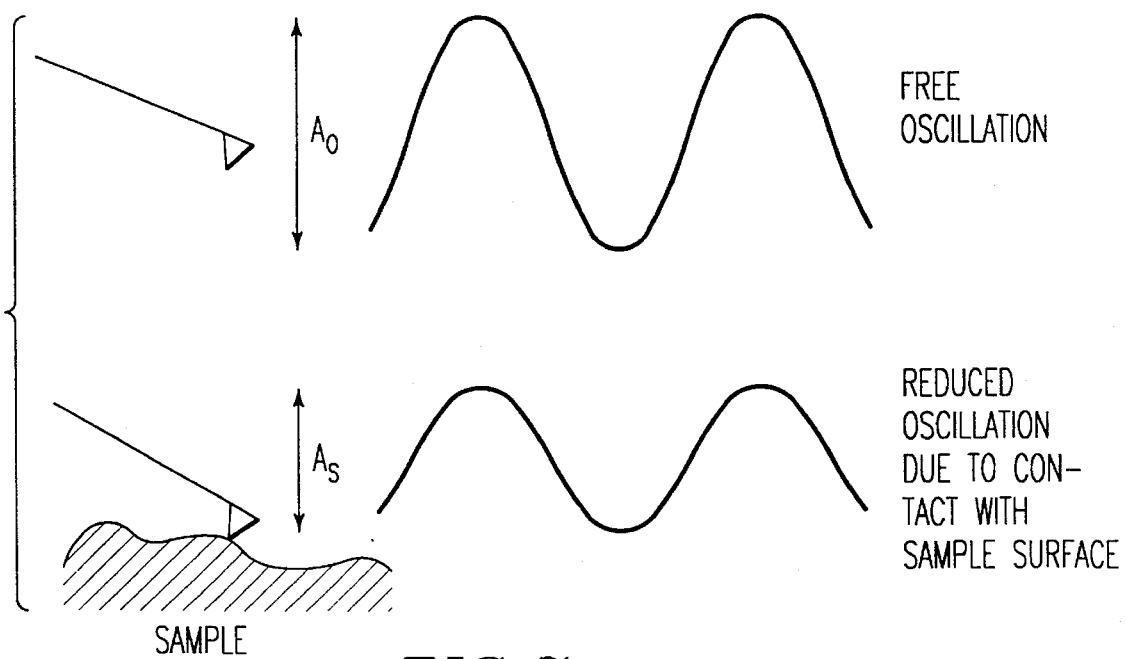
FIG. 7 is an illustration of the operation of a vibrating lever brought close to a surface in a preferred embodiment of the present invention.
Figure 8:
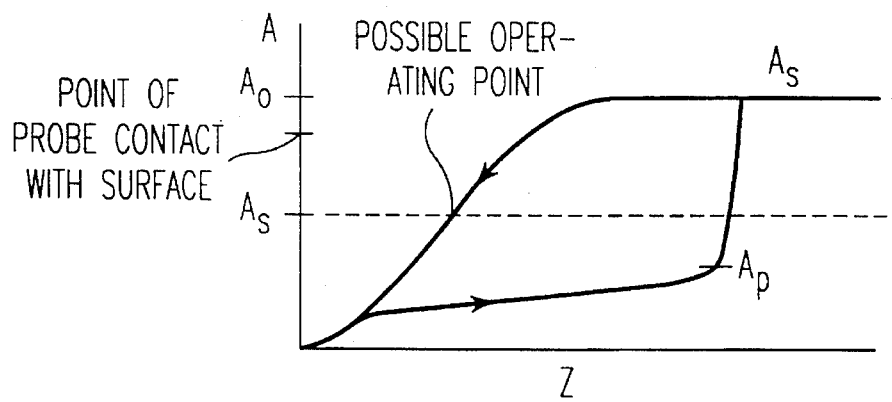
FIG. 8 is a graph of an amplitude vs. position curve that illustrates the behavior of the probe oscillation in a preferred embodiment of the present invention as a function of probe height above a surface.

FIG. 7 shows that for a large free amplitude, $A_o$, the lever may be brought down to where the tip strikes the surface. The energy lost by striking the surface and overcoming the fluid layer attraction limits the oscillation to a reduced value, A, but does not stop the oscillation as happens for low drive oscillation amplitudes. The difference in behavior for higher amplitude oscillations is illustrated in FIG. 8 where the curve of FIG. 6 is duplicated for a free amplitude, $A_o$, of greater than 10 nm. As can be seen, there is wide range of limited amplitudes, with the probe striking the surface, that could be used as an operating point for a feedback loop. Abrupt capture of the probe does not take place, so stable operation is possible. As the curve shows, the lever may be further lowered such that oscillation is stopped. The withdraw characteristics are similar to the low amplitude case in that the amplitude increases gradually until a point is reached where the cantilever breaks free and resumes oscillation at the free amplitude.

Figure 1:
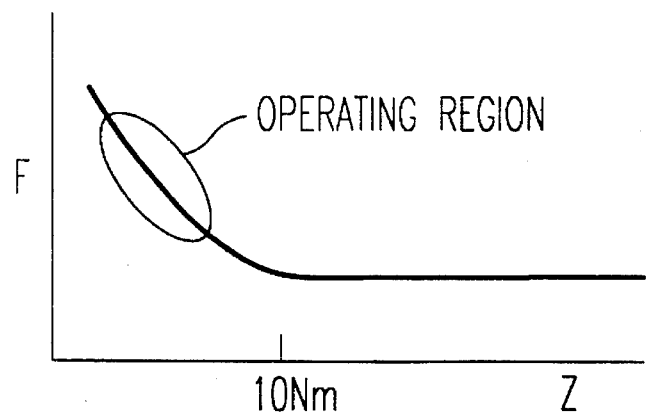
FIG. 1 is a graph showing the Van der Waals force as a function of height above a surface, and where a non-contact mode microscope must operate.
Figure 5:
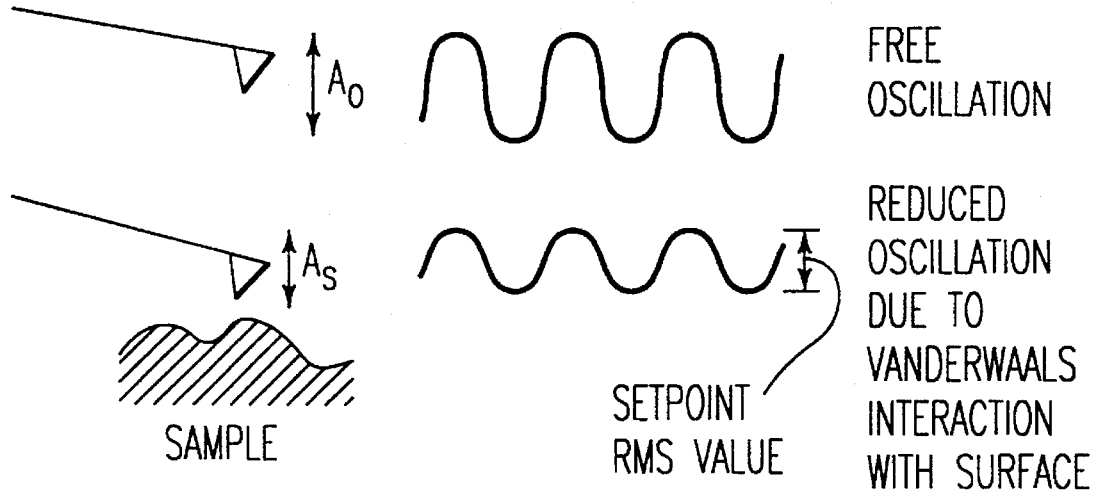
FIG. 5 is an illustration of the operation of a vibrating lever brought close to a surface in the prior art non-contact mode.
Figure 2:
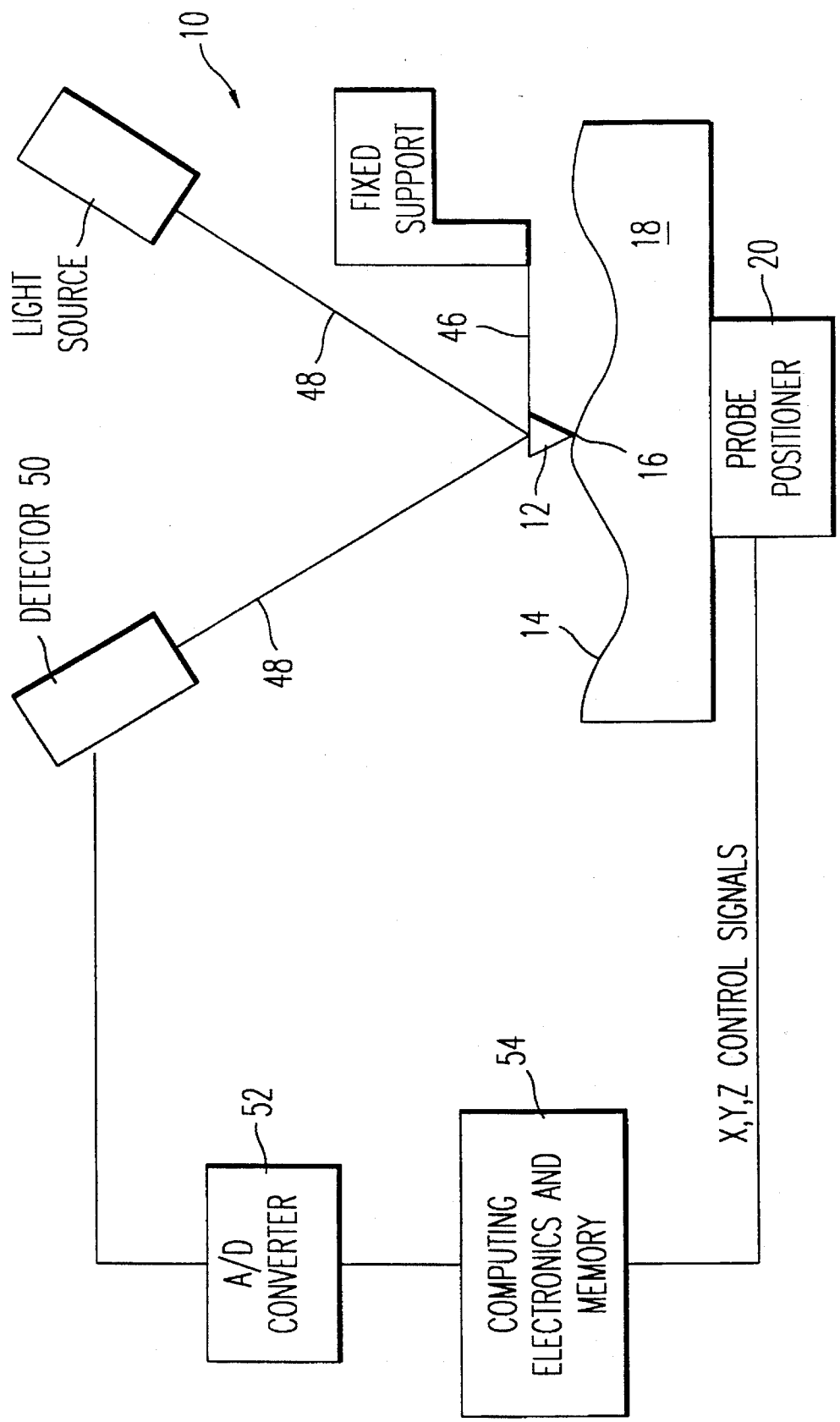
FIG. 2 is a simplified functional block diagram of the probe positioning apparatus of a prior art contact mode atomic force microscope.
Figure 3:
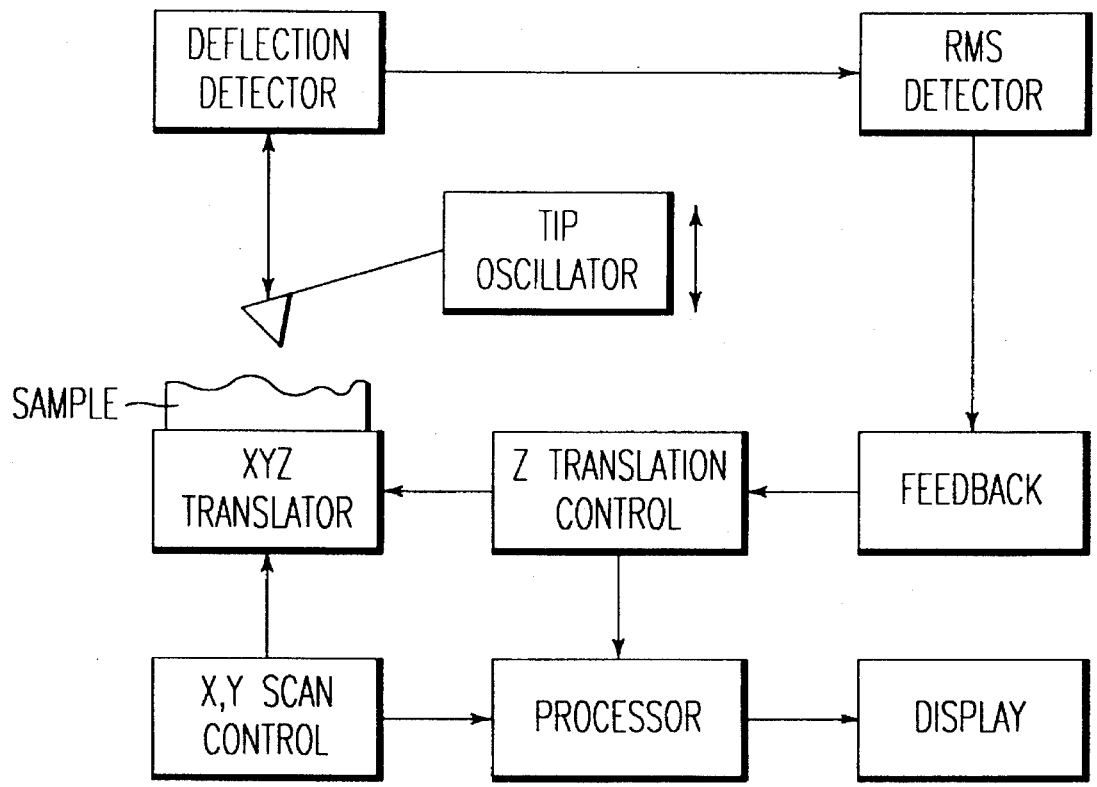
FIG. 3 is a simplified functional block diagram of the probe positioning apparatus of an atomic force microscope incorporating the present invention.

According to the present invention, the AFM is then operated at or near a cantilever resonance with sufficient amplitude that upon the probe striking the surface, the amplitude of oscillation of the probe is affected and the probe does not stick to the surface. A preferred version of this invention can be practiced on the AFM of FIG. 3. In FIG. 3, the tip is driven at a known amplitude and frequency oscillation, which is typically near a cantilever resonance. The amplitude, $A_o$, of this oscillation is detected by the deflection detector of FIG. 3, which is of the type shown in FIG. 2 and described by Hansma et al. When the tip is sufficiently far away from the surface, it will oscillate at the free amplitude, $A_o$, as shown in FIG. 7. The amplitude is measured in the AFM of FIG. 3 as an RMS value of the AC deflection detector signal. As shown in FIG. 7, when the tip is brought closer to the surface, striking the surface will limit, typically due to damping, the oscillatory motion. The amount of change is measurable as a decreased RMS value, $A_s$. This modified amplitude value may be used as a setpoint in the manner of other above described SPM's, such that as the tip is scanned laterally, the cantilever height may be adjusted with feedback to keep the RMS setpoint, $A_s$, at a constant value. Alternatively, changes in the amplitude of oscillation themselves can be used as a direct measure of surface topography. Thus, an image of the surface may be generated. The preferred embodiment uses a digital processor to provide the servo control by means of feedback programs executed by the processor. An analog feedback system is also possible. Strain gauges, such as resistive or piezo-resistive strain gauges or piezoelectric elements built into the cantilever arm, may be employed in place of the optical deflector detector shown.

Figure 4:
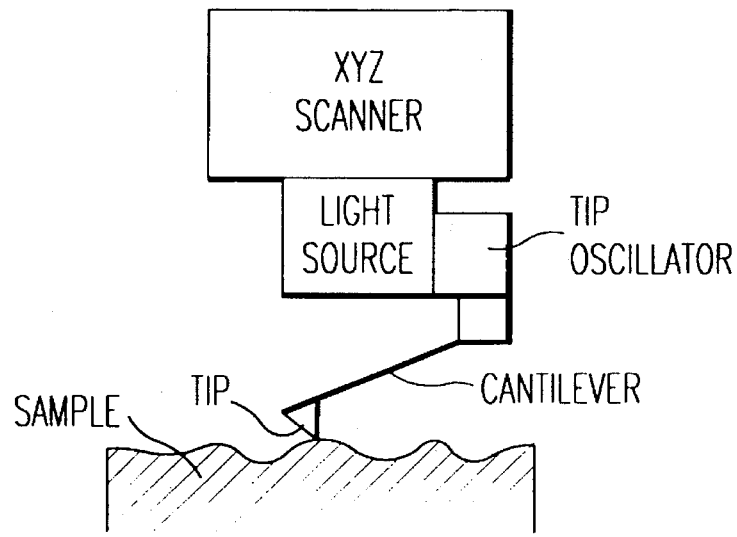
FIG. 4 is a block diagram of another type of AFM which may use the present invention.

As shown in FIG. 4, this version of the invention may also be implemented with other types of AFM's. For instance, the Compact AFM, disclosed in U.S. Pat. No. 5,189,906, describes an AFM where the probe is scanned rather than the sample. This AFM has provision to attach the probe to a separate positioner, which may be used to impart the oscillation, such that a setpoint may be established for contact with the surface.

This preferred embodiment of the invention has several advantages. This AFM can be operated with extremely light tapping forces. In general, the inventors have found that even using relatively stiff levers, on the order of 10's of newtons per meter in order to give high frequency oscillations such as up to 2 MHz, the forces on the sample are still extremely light. For instance, it is easy to establish a setpoint that is 10nm less than the free oscillation amplitude, which may be on the order of 100 nm. Thus the energy in the lever oscillation is much higher than that lost in each cycle by striking the surface. A conservative estimate of the actual force imparted to the surface is to assume the contact is inelastic and therefore the bending of the lever due to surface contact is just the amplitude gained in one cycle, approximately $(A_o-A_s)/Q$, where Q is the quality factor of the lever. Typical silicon levers have Q's of 100 to 1000, so for a setpoint 10 nm below the free amplitude of 100 nm the force per strike is 0.1 to 1 nanonewtons for a cantilever with a force constant of 10 newtons/meter. A contact mode AFM is limited to a contact force of about 50 nN in air due to the fluid layer attraction, and this can be reduced to about 1 nN operating in a liquid cell. So the present invention has extremely light contact forces and no shear forces at all. Thus, this technique is comparable to the non-contact mode in terms of surface damage, and operates much more stably and reliably. This mode effectively eliminates the effect of the surface fluid layer which limits the utility of both prior art contact and noncontact mode systems, and the advantage of operation under liquid disappears for many applications.

The invention also can achieve very high resolution. The oscillation can potentially be at very high frequency since only a very small lever must be driven, and because the low striking forces allow stiff levers to be used. This mode does not require resonant operation per se, but requires sufficient energy in the oscillation to overcome the stickiness of the surface. Thus in practice, resonant operation is necessary, but the higher harmonies of the resonant frequency may be usable. The inventors have successfully operated the invention at oscillation frequencies of up to 2 MHz. It is straightforward to oscillate at a frequency that for typical scan sizes and rates will cause the tip to strike the surface many times before it has displaced laterally by one tip diameter. Thus the lateral resolution is only limited by the tip size, which is much better resolution than achieved by prior art non-contact AFM's, whose resolution is determined by the height of the tip above the surface. Since the vertical deflection detector for a typical AFM has sub-nanometer resolution, the invention will also be able to maintain the setpoint to sub-nanometer accuracy. The invention has been successfully used to measure surface roughness on polished silicon of under 1 angstrom RMS. The invention does not depend on Van der Waals interactions like the non-contact AFM to sense the surface, so it can operate under fluids for samples that need to be hydrated.

As can be seen from FIG. 8, the region of stable operation for the invention is forgiving, but if the probe does become stuck to the surface there is significant hysteresis in the recovery process. The probe has to be pulled away a relatively large distance, then it will abruptly restart the free oscillation. It then has to be brought back to the operating height. If the setpoint amplitude $A_s$ is too low, the tip may remain oscillating in the surface fluid layer with the feedback system not trying to pull the tip loose. The inventors have found that this type of scanning is stable, but gives low resolution similar to the non-contact method. The amplitude-distance curve of FIGS. 6 and 8 is of great utility in evaluating the stickiness of a surface and choosing an $A_o$ and an $A_s$ that will produce satisfactory operation.

The preferred method of operation is to select a free amplitude $A_o$ such that the amplitude versus approach curve of FIG. 8 gives a continuous, stable decrease of amplitude as the lever is brought closer to the surface. The amplitude will depend on the tip sharpness, cantilever stiffness, and the sample surface, as well as current environmental conditions such as humidity. Preferably, in an SPM where this curve may be produced, displayed and adjusted in real time, the operator can determine a suitable free amplitude by starting with a low amplitude and increasing it until the curve changes shape from a curve like FIG. 6 to a curve like FIG. 8. The preferred setpoint for high resolution imaging topography is an $A_s$ that is greater than the amplitude at which the cantilever breaks free on the withdraw portion of FIG. 8. This point is labeled $A_p$. If one operates at a setpoint above $A_p$, then if the tip does become stuck to the surface, the feedback will return to a condition where the lever is free of the surface liquid layer.

Figure 11:
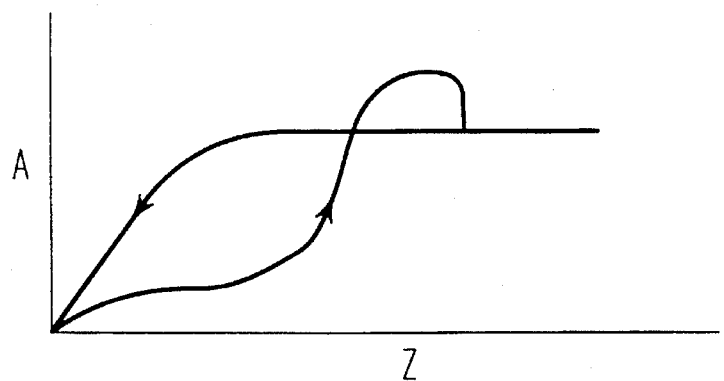
FIG. 11 is a graph of an amplitude-distance curve that illustrates the behavior of the probe oscillation in a preferred embodiment of the present invention as a function of probe height above a surface in a mode where the probe oscillates within the surface fluid layer.

Using the amplitude-distance curve to evaluate and select operating parameters is important because the actual behavior of the lever is sample and condition dependent. For most samples, for some value of $A_o$, a curve such as FIG. 8 may be produced, and if an $A_s$ is selected greater than $A_p$, stable operation will result in the imaging mode. However, some combinations of sample and conditions will not allow an amplitude-distance curve such as shown in FIG. 8. Either the pull-off curve or the approach curve may not follow the same pattern. For instance, the pull-off may be abrupt, indicating that the lever is affected little by the fluid layer on pull-off. This condition does not usually affect stable operation. Another condition may be an abrupt capture on approach, similar to small oscillation (non-contact) operation. For this case, it is vital to adjust the parameters to achieve as wide an operating region as possible. Moreover, the amplitude-distance curve may be used to set operating parameters that result in interesting and potentially useful modes. If $A_s$ is set lower than $A_p$ for a sample that has an amplitude-distance curve like FIG. 8, then if the lever can be initially pushed into the sticking position, the feedback loop will then maintain an imaging mode where the tip is oscillating within the fluid layer, and not actually in contact with the surface. This is a very stable non-contact mode. In this mode the instrument is essentially imaging the surface fluid layer, and the topography of this layer compared to the topography of the surface may provide useful information. The resolution is lower than when striking occurs, but is comparable to the less stable prior art non-contact mode where the tip is above the layer and the free amplitude oscillation is small. Another potential mode occurs if the lever is oscillated below resonance when the tip is far from the surface. When the tip is withdrawn, the fluid layer attached to the lever will lower the resonance such that the oscillation response to the drive signal may be actually larger than the free amplitude because the drive signal is now closer to resonance. This case is illustrated in FIG. 11. The inventors have noticed that this mode is highly sample dependent, and thus may contain useful information about the surface fluid layer. Although both of these modes should be avoided for reliable topographic measurements, they illustrate the usefulness of the amplitude-distance curve to intelligently select operating parameters, and the potential diversity of applications for the invention.

Figure 12:
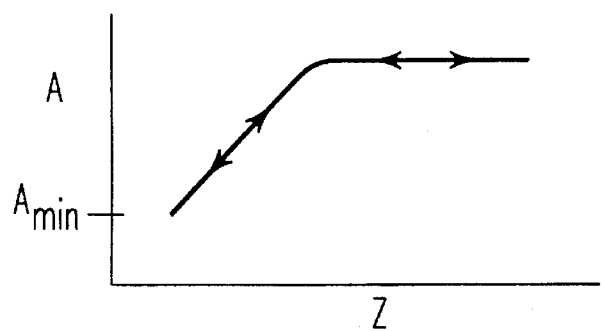
FIG. 12 is a graph of an amplitude-distance curve that stops before the amplitude decreases below a predetermined point.

Because stiff levers are typically used for the invention for high frequency operation, the inventors have found it is often useful when generating amplitude-distance curves to limit the distance over which the curve is obtained. If the lever is pushed sufficiently far into the surface that oscillation has ceased, then the force on the sample is simply the displacement of the lever times the spring constant. Typical levers suitable for this invention have spring constants many times those used in conventional contact AFM's, so the force exerted in an amplitude-displacement curve at the end where oscillation ceases can be very large. The sample and the cantilever may be damaged by the operation of obtaining the curve. Thus, the amplitude may be monitored during the distance modulation, and the lever only pushed into the sample until a predetermined decrease in amplitude is observed, and then pulled away. For instance, the digital controller that operates the scanner can be programmed to move the sample toward the cantilever until a certain amplitude or fraction of the free amplitude is reached and then caused the sample to be retracted. The user could enter the target amplitude into the controller. Such a curve is shown in FIG. 12. The probe is pushed into the sample until an amplitude $A_{min}$ is observed, and no further. The setpoint can be picked on the sloped part of the curve $A_{min}$. This technique will prevent damage to tip and sample during the amplitude-distance curve operation.

The invention can also be used to measure attractive force distributions such as magnetic fields, in a mixed mode operation, using both the invention and the prior art non-contact mode. For instance, if a magnetic tip is used, and a surface is scanned with alternating magnetic and non-magnetic regions, the reduction in amplitude will be affected not only by the tip striking the surface but also by the effect of the magnetic force gradient on the resonant frequency of the cantilever, as described above (if the driving frequency is slightly above the resonant frequency). Over areas where the magnetic field decreases the oscillation amplitude below the setpoint, the feedback will raise the lever to maintain the setpoint, such that the magnetic areas will appear in the image as regions of increased height. If the magnetic field interaction is strong enough, the tip will no longer be striking the surface over the magnetic regions. In regions with no magnetic field, the feedback will return the tip to the striking mode to maintain the setpoint. This same technique is potentially useful to measure other parameters such as electric field, which with appropriate tips and electronics may also exert force interactions on oscillating probes.

Figure 13:
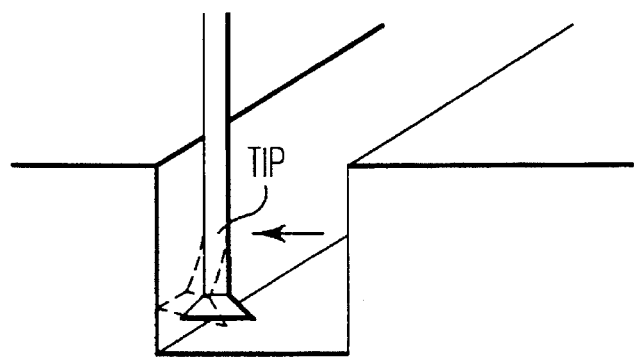
FIG. 13 is an illustration of how a probe is pulled into a steep wall in the prior art contact AFM.

Another problem with contact mode prior art AFM's is that they have poor performance when measuring steep sample features, such as trenches on integrated circuits. There are at least two problems associated with steep features. The first is that when the tip scans into the feature it twists laterally, and this lateral twist is not detected or interpreted properly by the vertical deflection detector. The second problem is that suitable tips need to be long and narrow to get into the grooves so these tips are not very stiff laterally. As the tip approaches the sidewall, attractive forces tend to pull the tip toward the surface as shown in FIG. 13, and the tip tends to stick to the surface because of surface tension as the scan moves away from a wall. Both of these effects distort measurements of linewidth or step height that need to be made to accuracies of fractions of a percent. Since the sticking may depend on ambient conditions, such as humidity, the measurements can vary from day to day. A modification of the invented technique can be used for such measurements.

Figure 9A:
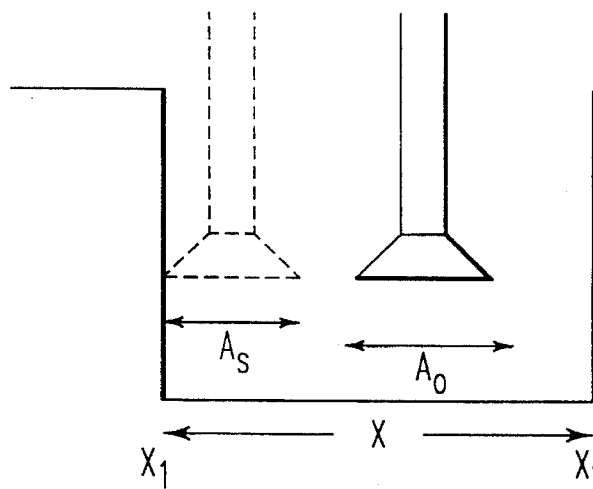
FIG. 9A is an illustration of how the present invention may be used to achieve improved performance when measuring surfaces with steep walls and trenches.
Figure 9B:
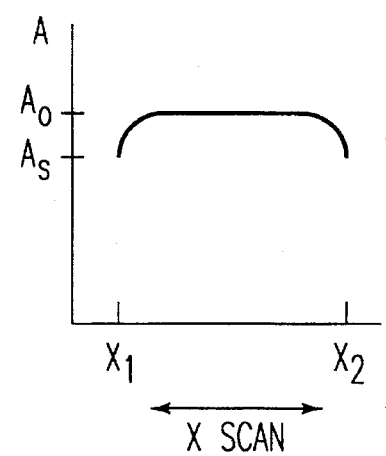
FIG. 9B is a graph illustrating oscillation amplitude as a function of scan position in the trench of FIG. 9A.

As shown in FIG. 9A, the oscillation can be done in a horizontal direction, using a probe with a suitable shape in a trench or near any step. If the probe is scanned laterally in the trench or near a step while oscillating laterally, the free oscillation amplitude will decrease when the wall is touched, as shown in FIG. 9B. Thus a setpoint for horizontal motion may be established that causes the probe to contact a trench or step sidewall with a series of taps so that measurement accuracy will be unaffected by attractive forces or sticking. This setpoint can be used to maintain the probe at a sidewall with low force and no sticking. The probe could then be scanned vertically and served laterally to maintain the setpoint in order to profile the wall. Alternatively, linewidth could be measured if the probe is scanned back and forth across a trench, such that the lateral motion reverses direction when a wall is encountered, as determined by the oscillation amplitude reducing to a setpoint at the walls. This process could be repeated as the probe is scanned along the trench to measure variations in linewidth, or a combination of lateral and vertical profiling could be used.

Figure 10:
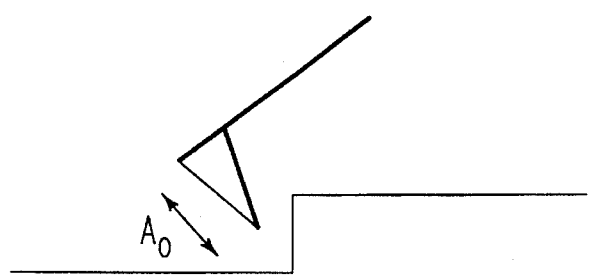
FIG. 10 is an illustration of an alternative approach where the present invention may be used to achieve improved performance when measuring surfaces with steep walls and trenches.

Yet another technique to measure steep walls is shown in FIG. 10. If the lever is mounted at an angle to the surface, preferably greater than the half angle of the probe, and the probe is oscillated perpendicular to the lever then the probe will scan along the surface until the wall is encountered, and will follow the wall up, because the oscillation setpoint will be affected both by the floor and the wall. Thus an x-z profile of the wall and floor will be produced. This approach will even work for undercut walls depending on the shape of the tip and nature of the undercut.

Figure 14A:
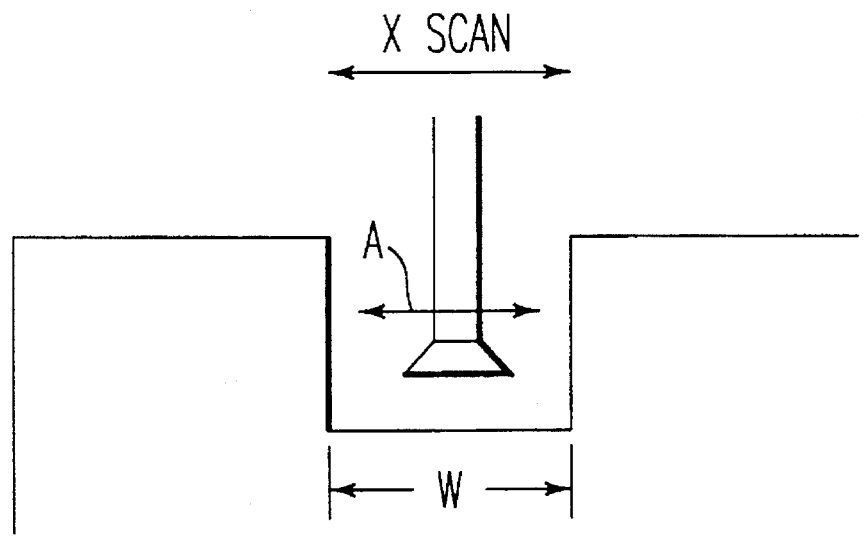
FIG. 14a is an illustration of scanning a probe tip in a trench while oscillating the probe tip.
Figure 14B:
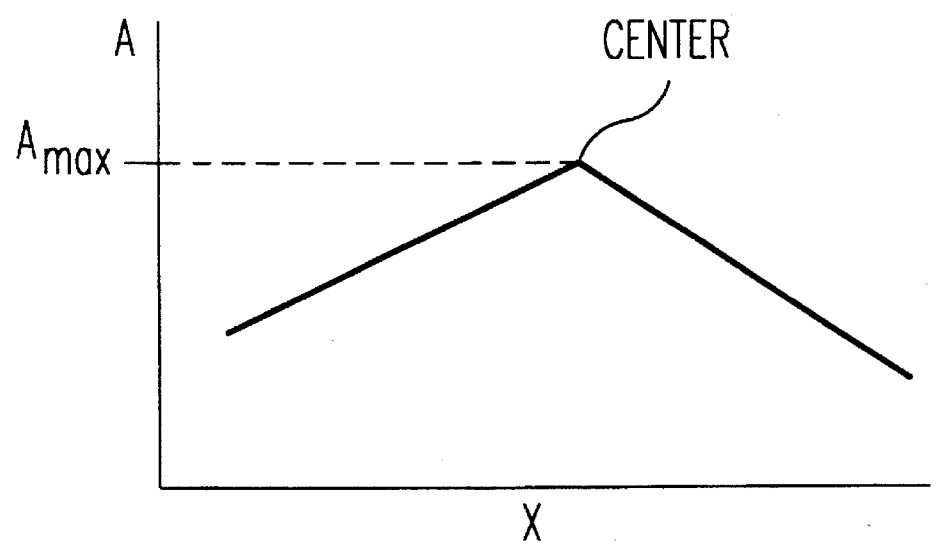

Another mode is to increase the amplitude of oscillation in a trench until the tip hits both sides. The tip could then be scanned laterally across the trench as shown in FIG. 14a so that the point of maximum oscillation is found. This maximum oscillation will be where the tip is in the center of the groove, hitting each side equally. This amplitude, $A_{max}$, shown in FIG. 14b, combined with the width of the tip, will give a measure of the width of the groove. One could then trace this cut vertically.

Further embodiments of the present invention utilize the phenomenon that as the probe taps the surface of the sample, the attractive force caused by the capillary forces on the tip and any momentary adhesion between the tip and sample material affect both the resonant frequency of the cantilever and the phase between the signal driving the cantilever oscillation and the actual oscillation of the free end of the cantilever. Although the invention relies on the probe oscillation having sufficient energy to prevent any long term, i.e., more than a small fraction of an oscillation cycle, sticking of the probe tip to the surface, the short period in each cycle where the probe strikes the surface will result in some adhesion. This momentary adhesion may depend on the elasticity or damping of the probe-surface contact and will measurably affect the resonant frequency and phase of the cantilever oscillation.

Figure 15:
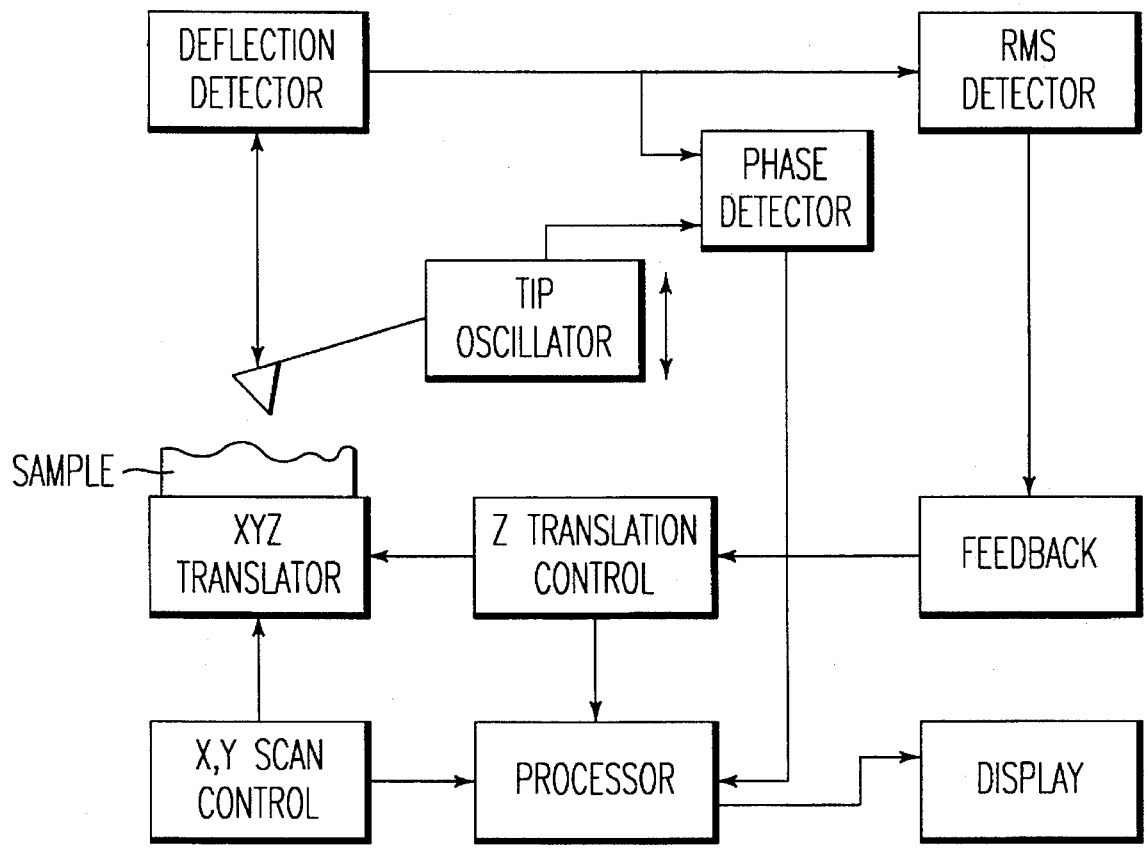
FIG. 15 is a block diagram of a further embodiment of the tapping AFM of the present invention, in which probe tip oscillation phase is detected as a function of lateral position during scanning.

This measurement of phase or resonant frequency during tapping of the probe against the surface is typically used as a chemical force microscope where the tip is made from a particular material or coated with a particular material so that the adhesion of the tip could be tailored to be specific to a certain substance on the surface. The phase or frequency measurement is then used to find and image where the specific substance is on the surface. An example of this is an antibody antigen interaction, where a specific antibody or antigen is placed on the tip in order to find its corresponding antigen or antibody on the surface. A prior art chemical force microscope is described by Frisbie, et al., SCIENCE 265:2071–2074, 1994, where a frictional force measured by the tip dragging across the surface is used to image the position of a specific chemical on the surface with different chemicals placed on the tip. As pointed out earlier, though, this dragging of the tip across the surface has adverse affects and should be avoided. For instance, the dragging might remove the material coated to the tip. According to the present invention, the tapping while measuring phase or resonant frequency is used as a measure of adhesion or chemical interaction In a preferred embodiment, the cantilever is oscillated and feedback is used to control the vertical position of the fixed end of the cantilever so that the oscillation of the cantilever is at a constant amplitude as the tip taps the surface, and changes in phase, from as small as 0.01 degrees to several degrees, are recorded as a function of the tip lateral position during scanning. An image is then made of the phase measurement as a function of lateral position, i.e., X and Y. Such a device is shown in FIG. 15, where a phase detector is included, with the detected phase being sent to the processor for storage and display.

Figure 16:
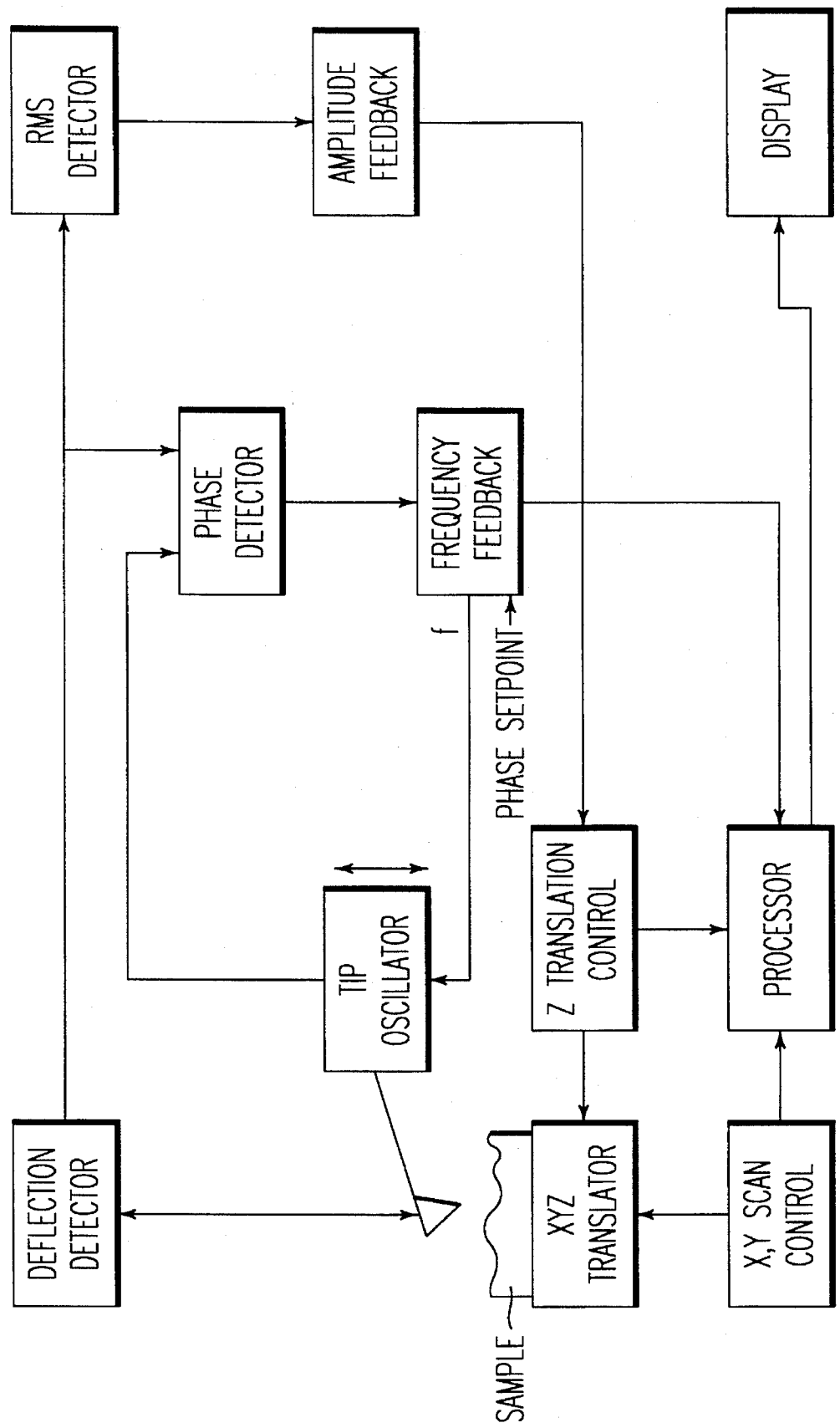
FIG. 16 is a block diagram illustrating a further embodiment of a tapping AFM according to the present invention, in which a change in resonant frequency of the oscillating probe tip is detected during tapping at constant amplitude.

In another embodiment, the resonant frequency of the cantilever, which is typically 100–300 KHz, normally 150 KHz, is tracked during tapping at constant amplitude, the change in frequency giving an indication of a change in momentary adhesion between the tip and surface. This is done with a second feedback loop operating to keep the phase constant by varying the drive frequency of the cantilever. If the phase is kept constant at, for instance, 90° then the drive frequency tracks the resonant frequency of the system, and gives a measure of the adhesion between the tip and sample. Typically, the resonant frequency varies in a range of 0.1 to 100 Hz. In this embodiment, one always drives the cantilever at the same point on the resonance curve, so the force of tapping would remain constant during imaging. This regulation of the frequency to follow the resonant frequency is also useful in cases where one wants to use a very light tapping force, which requires that the tapping force be well regulated, i.e., that the free amplitude $A_o$ does not vary as it would if the resonant frequency varies and the drive frequency stays fixed. Also, the frequency of resonance is more related to physical parameters of the oscillator than a phase measurement and allows a calculation of the adhesive force knowing other parameters of the cantilever. This frequency tracking embodiment is shown in FIG. 16.

One can gain more information about the interaction between the tip and surface during tapping by modulating the cantilever drive frequency, typically by an amount of 1–5 KHz, and observing the corresponding change in phase, i.e., determining the slope of the phase vs. frequency curve during tapping. For a Lorenzian shaped curve, which is the resonance curve of amplitude (A) vs. frequency (f) for an harmonic oscillator, as shown in FIGS. 17a and 17c, this slope as shown in FIGS. 17b and 17d is related to the width of the curve and therefore is a measure of the damping forces on the oscillator. As shown in FIG. 17c in relation to FIG. 17a, higher damping results in a broader cantilever resonance curve ($\gamma_1 < \gamma_2$ at the same amplitude), which, as shown in FIGS. 17b and 17d, decreases the slope ($\Delta p/\Delta f$, where $\Delta p$ is a change in phase produced by a change $\Delta f$ in frequency) of the phase curve in the region around the resonance. Thus, modulating the cantilever drive frequency by an amount $\Delta f$, monitoring the ratio $\Delta p/\Delta f$, and computing the slope $\Delta p/\Delta f$ provides a measure of the probe-sample interaction. In another embodiment of this invention, this damping is measured as a function of X and Y to produce an image of damping forces over the scanned surface. This is done in the frequency feedback method where the modulation is done while the average frequency is controlled to keep the average phase constant, i.e., the frequency is modulated about the resonant frequency. This will produce a modulation $\Delta p$ of the phase about the phase setpoint.

In the above described embodiments, feedback control of the amplitude and/or phase servos and/or frequency modulation are usually performed digitally by means of a digital computer, so that feedback control and modulation control can be programmed so that they do not conflict.

The adhesion and damping between the sample and probe may be dependent on the tapping force, which is controlled by the setpoint amplitude, the lower the setpoint the higher the force. Thus, the previous described measurements of phase, frequency, or damping could be made as a function of the tapping amplitude setpoint, by varying the tapping amplitude setpoint at each data point, each scanline, or each complete image. Comparison of the data obtained at different tapping amplitude setpoints can be made either qualitatively (visually) or quantitatively (arithmetically), according to this embodiment, and is useful to discriminate force dependent sample characteristics.

This measurement of phase or resonant frequency while tapping also provides information about surface coverage of substances put down on the surface of the sample, such as oil or lubricating layers on the sample, or monomolecular films applied to the surface.

The phase of the cantilever oscillation will not only be sensitive to adhesion, but also may be affected by long range forces such as electric and magnetic forces. These forces are measured more sensitively by lifting the cantilever off the surface so that phase shifts due to adhesion are avoided. This method of measuring long range forces is described in U.S. Pat. No. 5,308,974 by the same inventors.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. In a method of operating an atomic force microscope including a probe including a probe tip mounted on one end of a lever arm and wherein the probe tip is scanned across the surface of a sample and data representative of the surface of the sample is gathered in relation to the positioning of the lever arm as the probe tip is scanned, the improvement comprising:

a) oscillating the probe, including oscillating the probe tip at or near a resonant frequency of the probe or a harmonic of said resonant frequency and with a free oscillation amplitude $A_o$ sufficiently great so that the oscillating probe tip does not stick to the surface of the sample when the oscillating probe tip contacts the surface of the sample;

b) positioning the oscillating probe tip so that the oscillating probe tip repeatedly taps the surface of the sample with the probe tip repeatedly contacting and breaking contact with the surface of the sample without sticking to the surface of the sample;

c) translating the oscillating probe tip across the surface of the sample with the oscillating probe tip repeatedly tapping the surface of the sample;

d) controlling the distance between an opposite end of the lever arm opposite the probe tip and the sample so that the amplitude of oscillation of the probe tip is maintained essentially constant at an amplitude setpoint during said translating step;

e) detecting changes in phase in the oscillation of the probe tip during translating of the probe tip while the oscillation of the probe tip is maintained at essentially constant amplitude; and f) producing a signal indicative of changes in phase detected in said detecting step.

2. The method according to claim 1, wherein said detecting step comprises:

detecting deflection of said oscillating probe; and measuring a relative phase between a drive signal causing oscillation of said probe and detected deflection of said oscillating probe.

3. The method according to claim 1, comprising:

modulating the oscillating frequency of the oscillating probe during translating at essentially constant amplitude; and said detecting step comprising determining corresponding changes in phase of the oscillating probe tip during translating of said probe.

4. The method according to claim 1, comprising:

providing a probe including a substance selected to interact with a corresponding substance on said sample.

5. The method according to claim 4, wherein said step of providing a probe comprises:

providing a probe coated with an antibody or an antigen.

6. The method according to claim 1 wherein said oscillating step comprises:

oscillating said probe tip with a free oscillation amplitude greater than 10 nm.

7. The method according to claim 1, wherein said oscillating step comprises:

oscillating said probe tip with a free oscillation amplitude greater than 20 nm.

8. The method according to claim 1, comprising:

changing the amplitude setpoint and repeating said steps a) through f) while maintaining the amplitude of oscillation of the probe tip essentially constant at the changed amplitude setpoint.

9. The method according to claim 8, comprising:

comparing signals produced in repeated of steps f) to discriminate a force dependent characteristic of the sample.

10. The method according to claim 3, comprising:

changing the amplitude setpoint and repeating said steps a) through f) while maintaining the amplitude of oscillation of the probe tip essentially constant at the changed amplitude setpoint.

11. The method according to claim 10, comprising:

comparing signals produced in repeated of steps f) to discriminate a force dependent characteristic of the sample.

12. In a method of operating an atomic force microscope including a probe including a probe tip mounted on one end of a lever arm and wherein the probe tip is scanned across the surface of a sample and data representative of the surface of the sample is gathered in relation to the positioning of the lever arm as the probe tip is scanned, the improvement comprising:

a) oscillating the probe, including oscillating the probe tip at or near a resonant frequency of the probe or a harmonic of said resonant frequency and with a free oscillation amplitude $A_o$ sufficiently great so that the oscillating probe tip does not stick to the surface of the sample when the oscillating probe tip contacts the surface of the sample;

b) positioning the oscillating probe tip so that the oscillating probe tip repeatedly taps the surface of the sample with the probe tip repeatedly contacting and breaking contact with the surface of the sample without sticking to the surface of the sample;

c) translating the oscillating probe tip across the surface of the sample with the oscillating probe tip repeatedly tapping the surface of the sample;

d) controlling the distance between an opposite end of the lever arm opposite the probe tip and the sample so that the amplitude of oscillation of the probe tip is maintained essentially constant at an amplitude setpoint during said translating step;

e) detecting a relative phase between a drive signal causing oscillation of said probe and deflection of said probe; and f) controlling the frequency of the oscillation of the probe so that the relative phase detected in said detecting step is kept essentially constant during scanning.

13. The method according to claim 12, comprising:

g) producing a signal indicative of variations in the frequency of oscillation of the probe as a function of position during translating.

14. The method according to claim 13, comprising:

providing a probe including a substance selected to interact with a corresponding substance on said sample.

15. The method according to claim 14, wherein said step of providing a probe comprises:

providing a probe coated with an antibody or an antigen.

16. The method according to claim 13, wherein said oscillating step comprises:

oscillating said probe tip with a free oscillation amplitude greater than 10 nm.

17. The method according to claim 13, wherein said oscillating step comprises:

oscillating said probe tip with a free oscillation amplitude greater than 20 nm.

18. The method according to claim 13, comprising:

modulating the frequency of oscillation of the probe about the controlled frequency of step f) and determining corresponding changes in the phase of the oscillating probe tip during translating of said probe.

19. The method according to claim 12, comprising:

changing the amplitude setpoint and repeating said steps a) through f) while maintaining the amplitude of oscillation of the probe tip essentially constant at the changed amplitude setpoint.

20. The method according to claim 13, comprising:

changing the amplitude setpoint and repeating said steps a) through g) while maintaining the amplitude of oscillation of the probe tip essentially constant at the changed amplitude setpoint.

21. The method according to claim 20, comprising:

comparing signals produced in repeated of steps f) to discriminate a force dependent characteristic of the sample.

22. The method according to claim 18, comprising:

changing the amplitude setpoint and repeating said steps a) through g) while maintaining the amplitude of oscillation of the probe tip essentially constant at the changed amplitude setpoint.

23. The method according to claim 22, comprising:

comparing signals produced in repeated of steps f) to discriminate a force dependent characteristic of the sample.

24. In a method of operating an atomic force microscope including a probe including a probe tip mounted on one end of a lever arm and wherein the probe tip is scanned across the surface of a sample and data representative of the surface of the sample is gathered in relation to the positioning of the lever arm as the probe tip is scanned, the improvement comprising:

a) oscillating the probe, including oscillating the probe tip at or near a resonant frequency of the probe or a harmonic of said resonant frequency and with a free oscillation amplitude $A_o$ sufficiently great so that the oscillating probe tip does not stick to the surface of the sample when the oscillating probe tip contacts the surface of the sample;

b) positioning the oscillating probe tip so that the oscillating probe tip repeatedly taps the surface of the sample with the probe tip repeatedly contacting and breaking contact with the surface of the sample without sticking to the surface of the sample;

c) translating the oscillating probe tip across the surface of the sample with the oscillating probe tip repeatedly tapping the surface of the sample;

d) controlling the distance between an opposite end of the lever arm opposite the probe tip and the sample so that the amplitude of oscillation of the probe tip is maintained essentially constant at an amplitude setpoint during said translating step;

e) detecting a relative phase between a drive signal causing oscillation of said probe and deflection of said probe; and f) controlling the frequency of the oscillation of the probe so that the relative phase detected in said detecting step is kept essentially constant during scanning;

g) varying the frequency of the oscillation of the probe by an amount $\Delta f$ around the controlled frequency of step f) and determining a corresponding change $\Delta p$ in said relative phase; and h) producing a signal indicative of the ratio of $\Delta p/\Delta f$.

25. The method according to claim 24, comprising:

providing a probe including a substance selected to interact with a corresponding substance on said sample.

26. The method according to claim 25, wherein said step of providing a probe comprises:

providing a probe coated with an antibody or an antigen.

27. The method according to claim 24, wherein said oscillating step comprises:

oscillating said probe tip with a free oscillation amplitude greater than 10 nm.

28. The method according to claim 24, wherein said oscillating step comprises:

oscillating said probe tip with a free oscillation amplitude greater than 20 nm.

29. The method according to claim 24, comprising:

changing the amplitude setpoint and repeating said steps a) through g) while maintaining the amplitude of oscillation of the probe tip essentially constant at the changed amplitude setpoint.

30. The method according to claim 29, comprising:

comparing signals produced in repeated of steps g) to discriminate a force dependent characteristic of the sample.

* * * * *